(12) United States Patent
Sugahara et al.

(10) Patent No.: US 9,407,749 B2
(45) Date of Patent: Aug. 2, 2016

(54) IN-VEHICLE INFORMATION TERMINAL

(75) Inventors: Takahiro Sugahara, Hyogo (JP);
Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/414,599

(22) PCT Filed: Aug. 31, 2012

(86) PCT No.: PCT/JP2012/072162
§ 371 (c)(1),
(2), (4) Date: Jan. 13, 2015

(87) PCT Pub. No.: WO2014/033912
PCT Pub. Date: Mar. 6, 2014

(65) Prior Publication Data
US 2015/0181011 A1    Jun. 25, 2015

(51) Int. Cl.
*H04M 1/60* (2006.01)
*B60R 16/02* (2006.01)

(52) U.S. Cl.
CPC ............. *H04M 1/6083* (2013.01); *B60R 16/02* (2013.01)

(58) Field of Classification Search
CPC .................................................... H04M 1/6083
USPC ..................................................... 455/569.2
See application file for complete search history.

(56) References Cited

U.S. PATENT DOCUMENTS

| | | | |
|---|---|---|---|
| 8,190,214 B2 | 5/2012 | Kimura et al. | |
| 2003/0210159 A1* | 11/2003 | Arunkumar | G08G 1/0962 340/988 |
| 2009/0209296 A1* | 8/2009 | Kimura et al. | 455/567 |
| 2013/0274997 A1* | 10/2013 | Chien | 701/36 |

FOREIGN PATENT DOCUMENTS

| | | |
|---|---|---|
| CN | 202271930 U | 6/2012 |
| CN | 102582538 A | 7/2012 |
| DE | 10 2009 009 695 A1 | 8/2009 |
| JP | 2001-313698 A | 11/2001 |
| JP | 2005-328116 A | 11/2005 |
| JP | 2006-301830 A | 11/2006 |
| JP | 2009-88960 A | 4/2009 |
| JP | 2011-228828 A | 11/2011 |
| JP | 2012-27070 A | 2/2012 |

* cited by examiner

*Primary Examiner* — Michael Neff
(74) *Attorney, Agent, or Firm* — Birch, Stewart, Kolasch & Birch, LLP (57) ABSTRACT

An object is to provide a technique capable of displaying appropriate information on a passenger display unit used for a passenger other than a driver. An in-vehicle information terminal includes an in-vehicle device I/F and a controller. The in-vehicle device I/F is capable of communicating with an in-vehicle device having RSE monitors, and is capable of obtaining terminal position information indicating positions of communication terminals in a vehicle. The controller associates the RSE monitors and the communication terminals with each other, based on pre-registered display unit position information indicating the positions of the RSE monitors in the vehicle, and the terminal position information obtained by the in-vehicle device I/F.

7 Claims, 10 Drawing Sheets

IN-VEHICLE INFORMATION TERMINAL

TECHNICAL FIELD

The present invention relates to an in-vehicle information terminal which is capable of communicating with communication terminals, and more particularly, relates to an in-vehicle information terminal which is capable of appropriately controlling a display unit mounted on a vehicle.

BACKGROUND ART

Devices such as a display device for a driver and an RSE (Rear Seat Entertainment) display device for a rear seat passenger are known as in-vehicle devices mounted on a vehicle such as a car. Further, in recent years, an in-vehicle information terminal which communicates with communication terminals in a vehicle using wired connection such as cables or wireless connection such as Bluetooth (registered trademark) is proposed as one of in-vehicle devices (e.g., Patent Documents 1 and 2).

PRIOR ART DOCUMENT

Patent Document

Patent Document 1: Japanese Patent Application Laid-Open No. 2012-27070
Patent Document 2: Japanese Patent Application Laid-Open No. 2011-228828

SUMMARY OF INVENTION

Problems to be Solved by the Invention

Conventionally, an RSE display device for a rear seat passenger is configured only to display substantially the same contents as those of a display device for a driver. Therefore, when, for example, a communication terminal of a rear seat passenger set to a manner mode receives an incoming call, the incoming call cannot be individually displayed on the RSE display device which is browsed by the rear seat passenger.

Therefore, the present invention has been made in view of the above problem. An object thereof is to provide a technique which can display appropriate information on a passenger display unit used for a passenger other than a driver.

Means for Solving the Problems

An in-vehicle information terminal according to the present invention is an in-vehicle information terminal which is capable of communicating with a communication terminal, the in-vehicle information terminal including: an in-vehicle device interface which is capable of communicating with an in-vehicle device having a passenger display unit used for a passenger other than a driver, and which is capable of obtaining terminal position information indicating a position of the communication terminal in a vehicle; and a controller which associates the passenger display unit and the communication terminal with each other, based on pre-registered display unit position information indicating a position of the passenger display unit in the vehicle, and the terminal position information obtained by the in-vehicle device interface.

Effects of the Invention

The present invention is capable of associating a passenger display unit and a communication terminal. Consequently, it is possible to display appropriate information on the passenger display unit associated with the communication terminal of the passenger other than the driver, in association with an operation performed on the communication terminal thereof.

DESCRIPTION OF EMBODIMENTS

Embodiment

Figure 1:
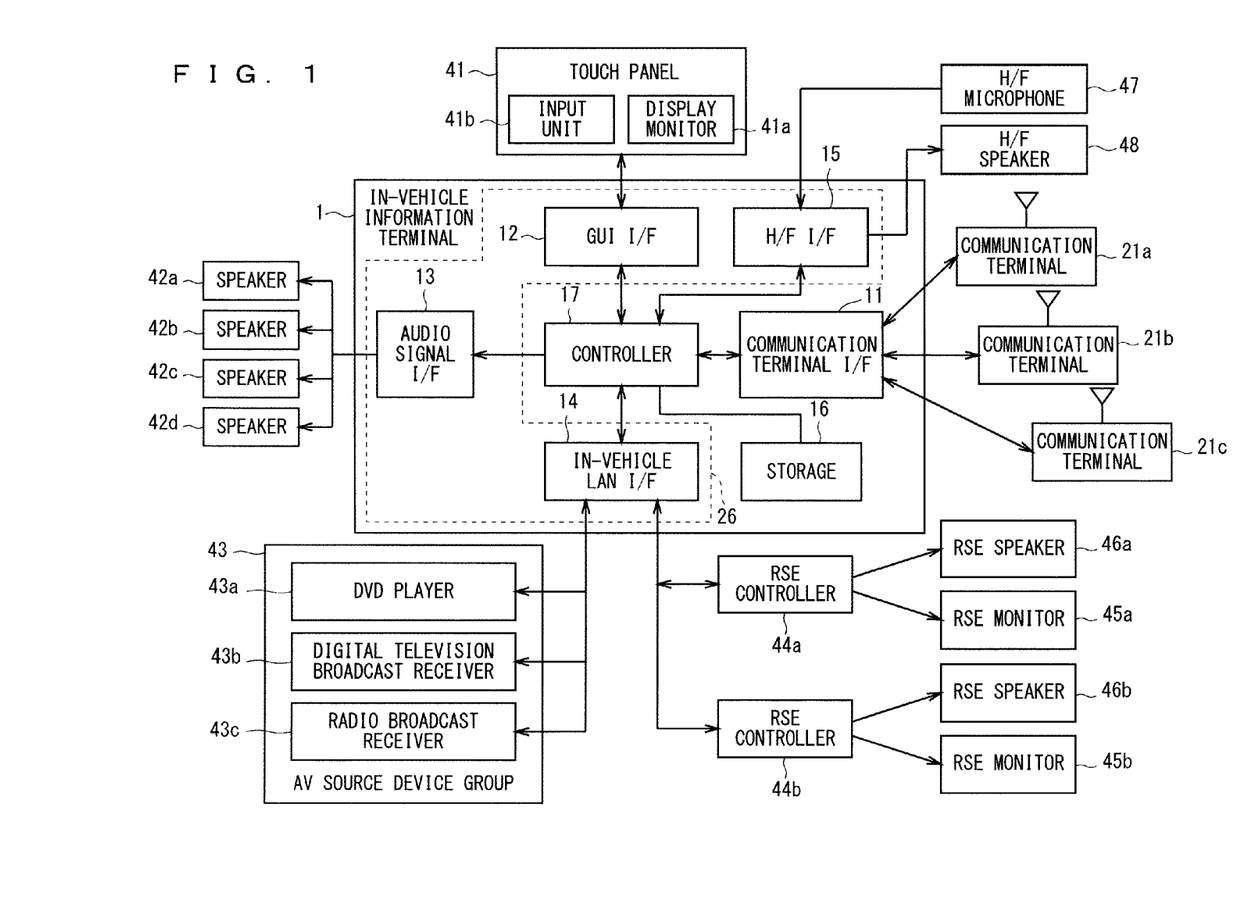
FIG. 1 is a block diagram illustrating a configuration of an in-vehicle system according to an embodiment.
Figure 2:
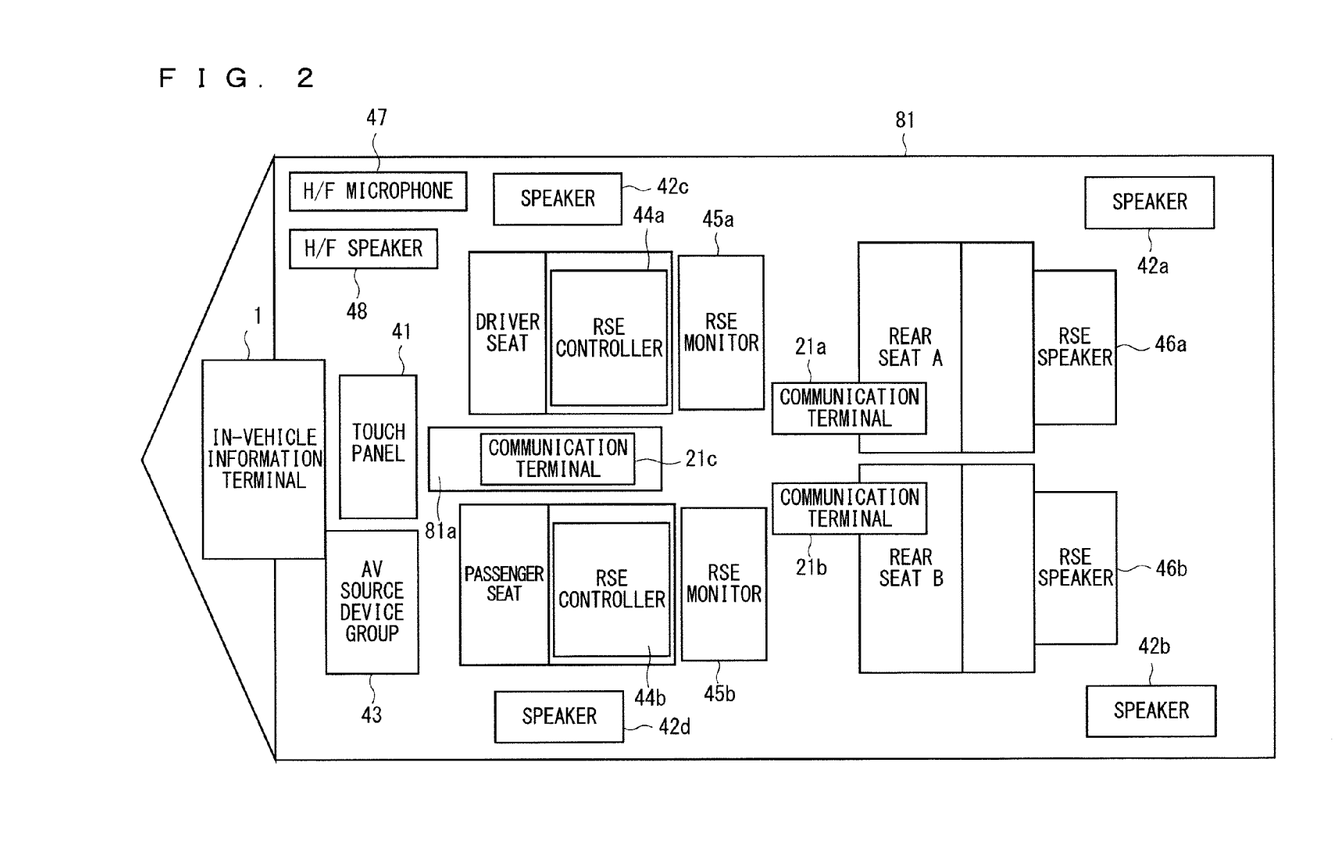
FIG. 2 is a top view illustrating an arrangement example of an in-vehicle information terminal and an in-vehicle device according to the embodiment.

FIG. 1 is a block diagram illustrating a configuration of an in-vehicle system which includes an in-vehicle information terminal 1 and a plurality of in-vehicle devices according to the embodiment of the present invention. FIG. 2 is a top view illustrating an arrangement example of the in-vehicle information terminal 1 and a plurality of in-vehicle devices mounted on a vehicle 81. The in-vehicle information terminal 1 is included in head units such as a car navigation device and a PND (Portable Navigation Device) arranged in a DIN space in a center of a dashboard of the vehicle 81. The description will be made below assuming that the in-vehicle information terminal 1 is included in a car navigation device.

The in-vehicle information terminal 1 includes a communication terminal interface (hereinafter, "interface" is abbreviated as "I/F") 11, a GUI I/F 12, an audio signal I/F 13, an in-vehicle LAN I/F 14, a handsfree (hereinafter, "handsfree" is abbreviated as "H/F") I/F 15, a storage 16 which stores various pieces of information and a controller 17 which performs overall control of these components.

The communication terminal I/F 11 can communicate with communication terminals 21a, 21b, and 21c such as mobile telephones and smartphones by wired connection such as cables and wireless connection such as WiFi and Bluetooth (registered trademark). That is, the in-vehicle information terminal 1 can communicate with the communication terminals 21a to 21c. The description will be made below assuming that, as illustrated in FIG. 2, the communication terminal 21a is a communication terminal of a rear seat passenger, positioned at a rear seat A at the back of a driver seat, the communication terminal 21b is a communication terminal of a rear seat passenger, positioned at a rear seat B at the back of a passenger seat, and the communication terminal 21c is a communication terminal of the driver, placed on a cradle 81a near the driver seat.

The GUI I/F 12, the audio signal I/F 13, the in-vehicle LAN I/F 14, and the H/F I/F 15 among components of the in-vehicle information terminal 1 form an in-vehicle device I/F 26. This in-vehicle device I/F 26 can communicate with a plurality of in-vehicle devices using wired connection such as cables and wireless connection such as WiFi or Bluetooth (registered trademark).

As illustrated in FIG. 2, the plurality of in-vehicle devices described herein includes a touch panel 41 and an AV source device group 43 which are provided in the center of a dashboard of the vehicle 81, a plurality of (four herein) speakers 42a, 42b, 42c, and 42d which are provided on side portions of the vehicle 81, an RSE (Rear Seat Entertainment) controller 44a and an RSE monitor 45a which are provided to a head rest of the driver seat, an RSE controller 44b and an RSE monitor 45b which are provided to a head rest of the passenger seat, RSE speakers 46a and 46b which are provided at the back of the rear seats A and B, and a H/F microphone 47 and a H/F speaker 48 which are provided near the driver seat.

Returning to FIG. 1, the in-vehicle device I/F 26 configured as above inputs and outputs (transmits and receives) various pieces of information (signals) between the controller 17 and a plurality of in-vehicle devices. Consequently, the controller 17 can perform overall control of a plurality of in-vehicle devices. Next, each component of the in-vehicle device I/F 26 and each of the plurality of in-vehicle devices will be described in detail.

The GUI I/F 12 is communicably connected with the touch panel 41 which includes a display monitor 41a and an input unit 41b. The display monitor 41a is, for example, a liquid crystal monitor, and displays information (e.g., navigation information) received from the controller 17 through the GUI I/F 12. The input unit 41b receives input information from a user, and outputs the received input information to the controller 17 through the GUI I/F 12.

As described above, the in-vehicle device I/F 26 (GUI I/F 12) according to the present embodiment can communicate with the in-vehicle device (touch panel 41) having a driver display unit (display monitor 41a) used for the driver.

The audio signal I/F 13 is communicably connected with the speakers 42a to 42d. The speakers 42a to 42d output an audio based on an audio signal received from the controller 17 through the audio signal I/F 13.

The in-vehicle LAN I/F 14 is communicably connected with the AV source device group 43 and the RSE controllers 44a and 44b. Herein, as illustrated in FIG. 1, the AV source device group 43 includes a DVD (Digital Versatile Disc) player 43a which plays back data of a DVD disc, a digital television broadcast receiver 43b which receives DTV (Digital Television) broadcast, and a radio broadcast receiver 43c which receives radio broadcast.

The DVD player 43a plays back the above data of the DVD disc according to information received from the controller 17 through the in-vehicle LAN I/F 14. The digital television broadcast receiver 43b receives DTV broadcast according to information received from the controller 17 from the in-vehicle LAN I/F 14. The radio broadcast receiver 43c receives radio broadcast according to information received from the controller 17 through the in-vehicle LAN I/F 14. AV information (AV source) played back and received by the AV source device group 43 is transmitted to the controller 17 through the in-vehicle LAN I/F 14, is displayed on the display monitor 41a of the touch panel 41 and the RSE monitors 45a and 45b, and is output as an audio from the speakers 42a to 42d and the RSE speakers 46a and 46b, under control of the controller 17.

The RSE controller 44a controls the RSE monitor 45a and the RSE speaker 46a based on information received from the controller 17 through the in-vehicle LAN I/F 14. For example, the RSE controller 44a performs control to cause the RSE monitor 45a to display information (e.g., navigation information) from the controller 17, and cause the RSE speaker 46a to output an audio. Similarly to the RSE controller 44a, the RSE controller 44b controls the RSE monitor 45b and the RSE speaker 46b based on information received from the controller 17 through the in-vehicle LAN I/F 14. According to the above configuration, the controller 17 controls the RSE monitors 45a and 45b and the RSE speakers 46a and 46b through the RSE controllers 44a and 44b.

As described above, the in-vehicle device I/F 26 (in-vehicle LAN I/F 14) according to the present embodiment can communicate with in-vehicle devices (e.g., an AV system of the rear seat A which includes the RSE controller 44a and the RSE monitor 45a, and an AV system of the rear seat B which includes the RSE controller 44b and the RSE monitor 45b) having passenger display units (RSE monitors 45a and 45b) used for passengers other than the driver.

The H/F I/F 15 is communicably connected with the H/F microphone 47 and the H/F speaker 48.

The H/F microphone 47 outputs an audio signal corresponding to an audio received from the driver, to the controller 17 through the H/F I/F 15, and the controller 17 transmits the audio signal to the communication terminal 21c of the driver through the communication terminal I/F 11. The communication terminal 21c of the driver transmits the audio signal to a communication terminal outside the vehicle 81.

Further, the communication terminal 21c of the driver outputs the audio signal received from the communication terminal outside the vehicle 81, to the controller 17 through the communication terminal I/F 11, and the controller 17 transmits the audio signal to the H/F speaker 48 through the H/F I/F 15. The H/F speaker 48 outputs an audio based on the audio signal. The in-vehicle information terminal 1 configured as above enables the driver to make a call (i.e., handsfree call) using the H/F microphone 47 and the H/F speaker 48, without holding the communication terminal 21c by the hand.

<Operation>

Next, a setting and an operation of the in-vehicle system including the in-vehicle information terminal 1 according to the present embodiment will be described.

Figure 3:
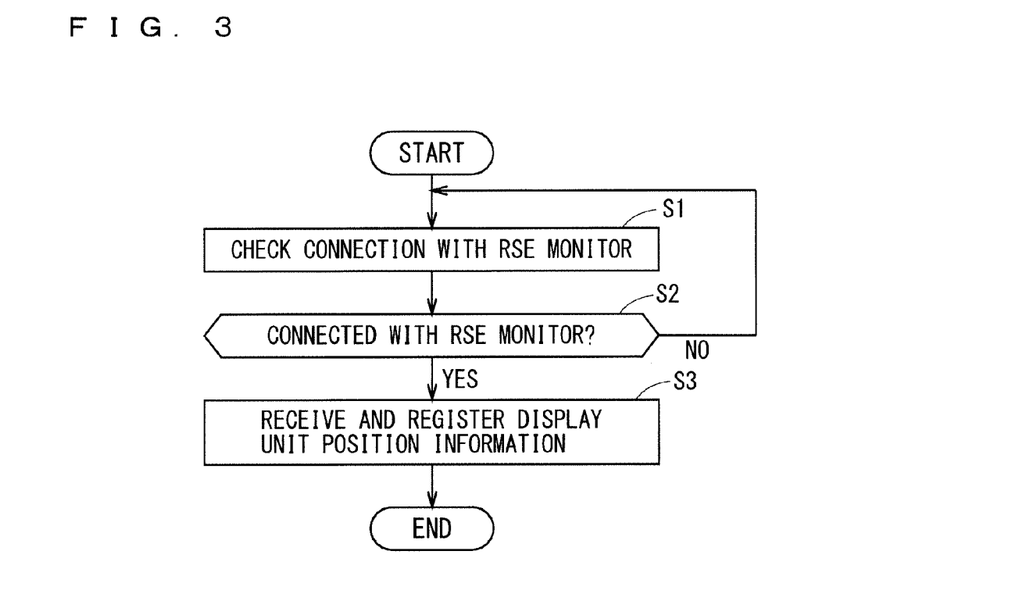
FIG. 3 is a flowchart illustrating an operation of the in-vehicle system according to the embodiment.

FIG. 3 is a flowchart illustrating an operation of the in-vehicle system performed when the RSE monitors (herein, the RSE monitors 45a and 45b) are attached to the vehicle 81. Note that, in the following description, connecting the in-vehicle LAN I/F 14 communicably with the AV system having the RSE monitors will be simply described that "the in-vehicle LAN I/F 14 is connected with the RSE monitors".

First, in step S1, the controller 17 checks whether the in-vehicle LAN I/F 14 is connected with the RSE monitors attached to the vehicle 81. In step S2, when it is determined that the in-vehicle LAN I/F 14 is connected with the RSE monitors, the process proceeds to step S3. Meanwhile, when it is not determined that the in-vehicle LAN I/F 14 is connected with the RSE monitors, steps S1 and S2 are repeated until it is determined that the in-vehicle LAN I/F 14 is connected with the RSE monitors.

In step S3, the touch panel 41 receives, from the user, display unit position information indicating the position of the RSE monitor in the vehicle 81, and outputs the received display unit position information to the GUI I/F 12. Note that, the display unit position information described herein is information indicating that "the connected RSE monitor is an RSE monitor mainly used by a rear seat passenger positioned at the rear seat A". That is, the display unit position information is information which enables specification of the position of the RSE monitor based on a seat type (one of the rear seats A and B) of the rear seat passenger who mainly uses the RSE monitor. The controller 17 registers in the storage 16 the display unit position information inputted to the GUI I/F 12, and ends the operation illustrated in FIG. 3.

Figure 4:
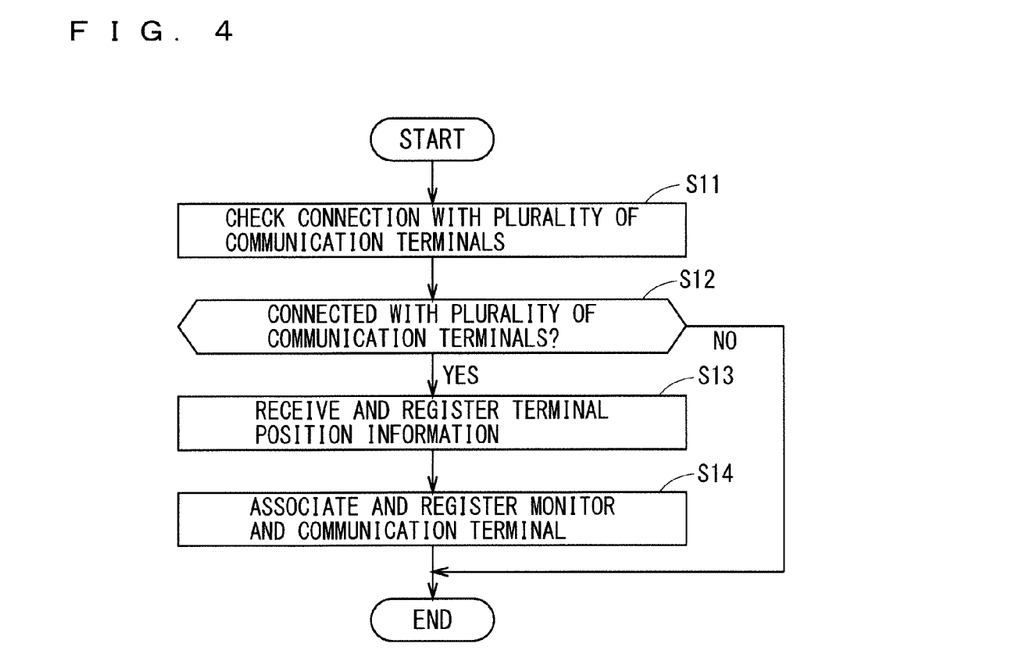
FIG. 4 is a flowchart illustrating an operation of the in-vehicle system according to the embodiment.

FIG. 4 is a flowchart illustrating an operation of the in-vehicle system performed when the driver and the passenger of the vehicle 81 are changed.

First, in step S11, the controller 17 checks whether a plurality of communication terminals are connected to the communication terminal I/F 11. For example, the controller 17 checks whether the communication terminal of the driver and a communication terminal different from that communication terminal are connected to the communication terminal I/F 11. In step S12, when it is determined that a plurality of communication terminals are connected to the communication terminal I/F 11, the process proceeds to step S13. Meanwhile, when it is not determined that a plurality of communication terminals are connected to the communication terminal I/F 11, the operation illustrated in FIG. 4 ends.

In step S13, the touch panel 41 receives, from the user, terminal position information indicating the positions of the communication terminals (communication terminals 21a to 21c) in the vehicle 81, and outputs the received terminal position information to the GUI I/F 12. Note that, the terminal position information described herein is used to specify the position of each communication terminal based on the seat type (any of the driver seat, the passenger seat, and the rear seats A and B).

Thus, the in-vehicle device I/F 26 (GUI I/F 12) according to the present embodiment can obtain the terminal position information indicating the positions of the communication terminals 21a to 21c in the vehicle 81. The controller 17 registers in the storage 16 the terminal position information obtained by the GUI I/F 12.

In step S14, the controller 17 associates the RSE monitors 45a and 45b and the display monitor 41a, and the communication terminals 21a, 21b, and 21c with each other, based on the display unit position information registered in advance in step S3 (FIG. 3) and the terminal position information obtained by the in-vehicle device I/F 26 (GUI I/F 12) in step S13.

More specifically, the controller 17 associates the RSE monitor (i.e., the RSE monitor 45a) whose position is indicated as the rear seat A by the display unit position information, with the communication terminal (i.e., the communication terminal 21a) whose position is indicated as the rear seat A by the terminal position information. Similarly, the controller 17 associates the RSE monitor (i.e., the RSE monitor 45b) whose position is indicated as the rear seat B by the display unit position information, with the communication terminal (i.e., the communication terminal 21b) whose position is indicated as the rear seat B by the terminal position information. Further, the controller 17 associates the display monitor 41a of the touch panel 41, with the communication terminal (i.e., the communication terminal 21c) whose position is indicated as the driver seat by the terminal position information.

Figure 5:
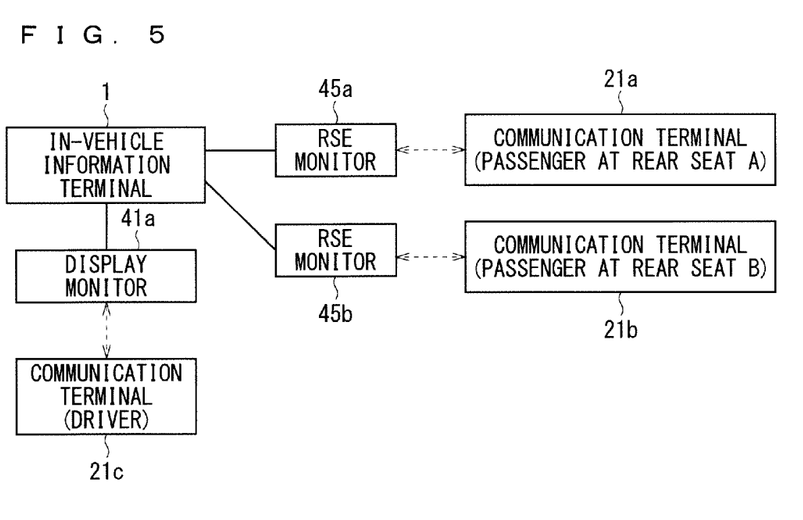
FIG. 5 is a view illustrating an association relationship generated by the in-vehicle information terminal according to the embodiment.

FIG. 5 is a view illustrating an association relationship between the RSE monitors 45a and 45b and the display monitor 41a, and the communication terminals 21a and 21b and the communication terminal 21c which is generated by way of association performed by the controller 17. The controller 17 registers the association relationship in the storage 16, and ends the operation illustrated in FIG. 4.

Figure 6:
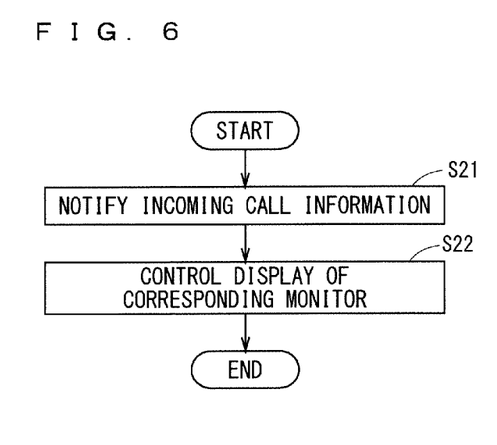
FIG. 6 is a flowchart illustrating an operation of the in-vehicle system according to the embodiment.

FIG. 6 is a flowchart illustrating the operation of the in-vehicle system when the communication terminals of the rear seat passengers (herein, the communication terminals 21a and 21b) receive incoming calls after the association relationship illustrated in FIG. 5 is registered in the storage 16. Although the operation performed when the communication terminal 21a receives an incoming call will be described below, the same operation is performed when the communication terminal 21b receives an incoming call.

First, in step S21, upon receipt of the incoming call, the communication terminal 21a notifies incoming call information to the controller 17 through the communication terminal I/F 11. Herein, the incoming call information is information including a name of an owner registered in the communication terminal 21a and a telephone number of a calling party, and is information including the name of the calling party when the name of the calling party is registered in the communication terminal 21a.

Figure 7:
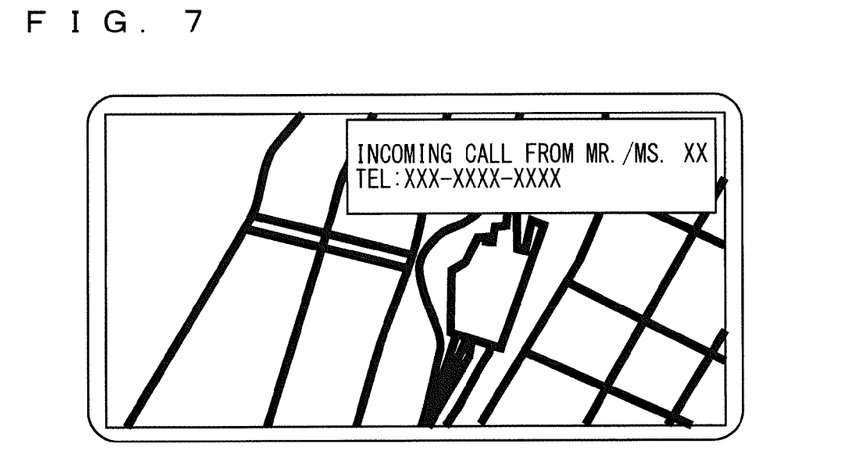
FIG. 7 is a view illustrating a display example of the in-vehicle system according to the embodiment.

In step S22, upon receipt of the incoming call information from the communication terminal 21a, the controller 17 controls a display of the RSE monitor 45a associated with the communication terminal 21a in step S14 (FIG. 4) through the in-vehicle device I/F 26 (in-vehicle LAN I/F 14). FIG. 7 is a view illustrating a display example of the RSE monitor 45a in step S22. In this display example, the name and the telephone number of the calling party of the communication terminal 21a are displayed at an upper right of a display screen. After the RSE monitor 45a is controlled, the operation illustrated in FIG. 6 ends.

The above in-vehicle information terminal 1 according to the present embodiment can associate RSE monitors and communication terminals with each other. Consequently, it is possible to individually display appropriate information on an RSE monitor associated with a communication terminal of the passenger other than the driver, in association with an operation performed on the communication terminal thereof. Hence, for example, when a communication terminal of a rear seat passenger which is set to a manner mode receives an incoming call, the incoming call information can be displayed on the RSE monitor browsed by the rear seat passenger. Consequently, the rear seat passenger can reliably know that there is an incoming call.

Note that, in the above description, in step S22 (FIG. 6), the controller 17 controls the display of the RSE monitor 45a when the communication terminal 21a receives an incoming call. In performing this control, when a power source of the RSE monitor 45a is in an OFF state, the controller 17 may perform control of switching the power source of the RSE monitor 45a to an ON state, and then perform control of causing the RSE monitor 45a to display incoming call information. Further, an incoming call may be notified using not only the display of the RSE monitor 45a but also an audio from the RSE speaker 46a.

Figure 8:
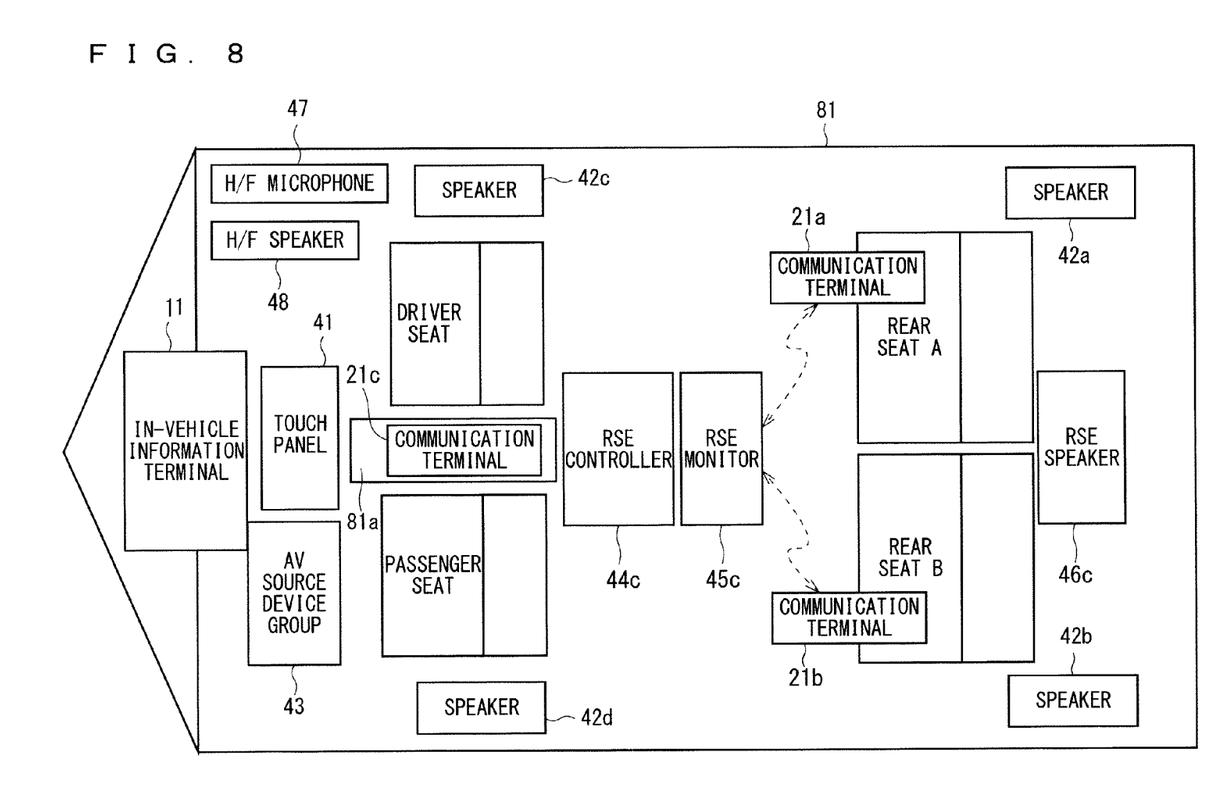
FIG. 8 is a top view illustrating another arrangement example of the in-vehicle information terminal and the in-vehicle device according to the embodiment.

Furthermore, in the above configuration, the RSE monitors 45a and 45b whose numbers are the same as the number of the rear seats A and B are provided. Consequently, it is possible to display incoming call information of the communication terminals 21a and 21b on the RSE monitors 45a and 45b on a one-on-one basis. However, depending on a situation of the in-vehicle device, only one RSE monitor 45c (the RSE controller 44c and the RSE speaker 46c) shared by rear seat passengers may be provided, as illustrated in FIG. 8.

In this case, the controller 17 may be configured to associate one RSE monitor 45c with the plurality of communication terminals 21a and 21b. With this configuration, it is possible to flexibly accommodate an installation situation of in-vehicle devices.

Further, in the above configuration, the in-vehicle device I/F 26 (GUI I/F 12) is communicably connected with the touch panel 41. However, the present invention is not limited thereto, and the in-vehicle device I/F 26 (GUI I/F 12) may be communicably connected with a display monitor and an input unit, respectively, which are configured by individual hardware, instead of the touch panel 41. Further, in this configuration, an operation panel including push buttons may be applied to the input unit, or a remote controller capable of performing a remote operation may be applied to the input unit.

Modified Example 1

When communication terminals 21a and 21b receive incoming calls, a controller 17 according to this modified example is configured to control not only displays of RSE monitors 45a and 45b but also a display of a display monitor 41a associated with a communication terminal 21c of a driver through an in-vehicle device I/F 26 (GUI I/F 12). Further, it is possible to make various settings regarding the displays of the display monitor 41a and the RSE monitors 45a and 45b when the communication terminals 21a and 21b receive incoming calls.

Figure 9:
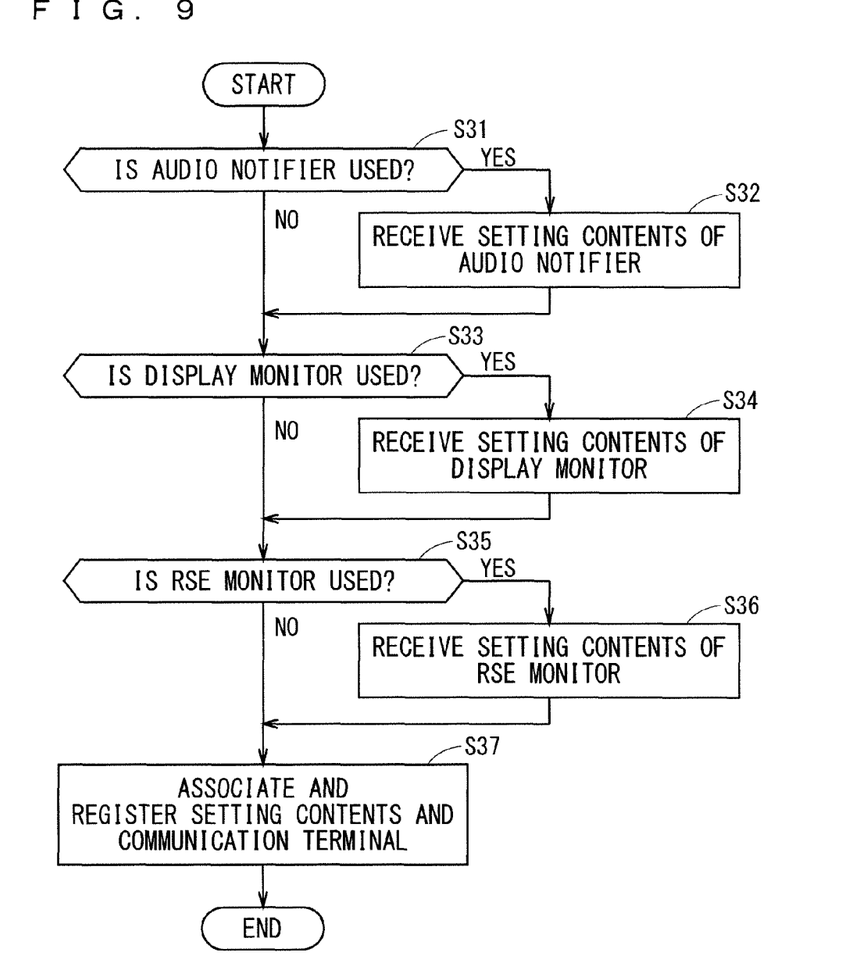
FIG. 9 is a flowchart illustrating an operation of an in-vehicle system according to a modified example 1.

FIG. 9 is a flowchart illustrating a display operation in the in-vehicle system according to the modified example 1. Settings and operations of the display monitor 41a and the RSE monitors 45a and 45b for notifying incoming call information when the communication terminal 21a of a passenger at a rear seat A receives an incoming call will be described below. Note that, the operation performed when the communication terminal 21b receives an incoming call is the same as the operation described below.

First, in step S31, the controller 17 receives, from a user through a touch panel 41, whether or not to use an audio notifier (at least one of speakers 42a to 42d and RSE speakers 46a and 46b) capable of making a notification by an audio. When receiving that the audio notifier is used, the process proceeds to step S32, and otherwise, the process proceeds to step S33.

In step S32, the controller 17 receives setting contents related to the audio of the audio notifier from the user through the touch panel 41. After the settings, if the communication terminal 21a receives an incoming call, the controller 17 causes the audio notifier to notify incoming call information with an audio matching the setting contents. Thereafter, the process proceeds to step S33.

In step S33, the controller 17 receives, from the user through the touch panel 41, whether or not to use a display of the display monitor 41a. When receiving that the display of the display monitor 41a is used, the process proceeds to step S34, and otherwise, the process proceeds to step S35.

In step S34, the controller 17 receives, from the user through the touch panel 41, the setting contents related to the display of the display monitor 41a. Herein, the setting contents related to the display include display contents and a size and a position of the display contents.

Figure 10A:
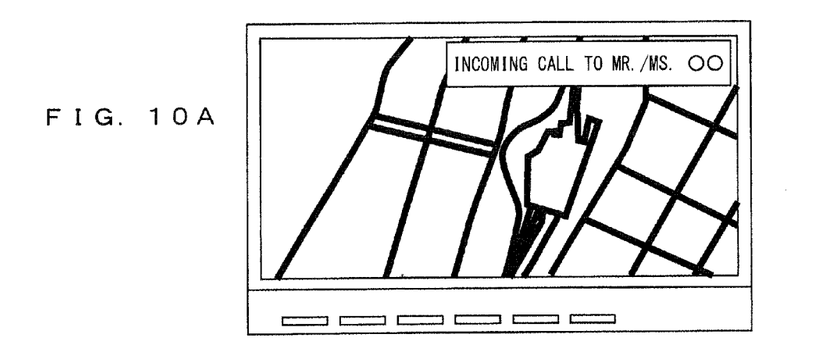
FIGS. 10A to 10C are views illustrating a display example of the in-vehicle system according to the modified example 1.

For example, assume that a setting of "a name of an owner of a communication terminal which received an incoming call" is received as display contents related to the communication terminal 21a, and a setting of "an upper right of a screen" is received as a size and a position of display contents. After the setting, if the communication terminal 21a receives an incoming call, the controller 17 causes the display monitor 41a to notify incoming call information with the display matching the setting contents. That is, the controller 17 displays the name of the owner of the communication terminal 21a, at the upper right of the screen of the display monitor 41a as illustrated in FIG. 10A. This display allows the driver to know that the rear seat passenger received an incoming call in a state where privacy of the rear seat passenger is protected.

Figure 10B:
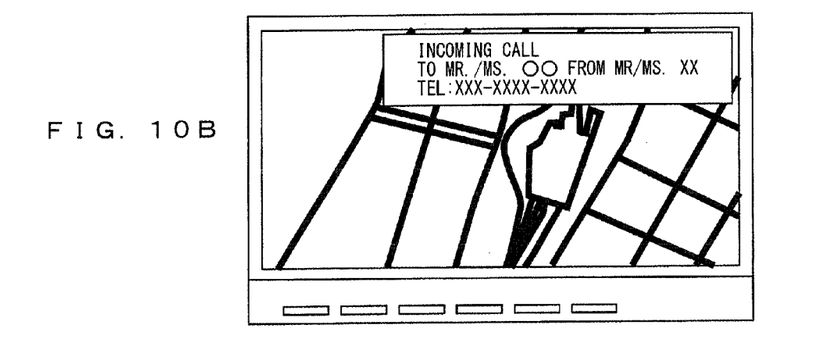

Further, for example, a setting of "a name and a telephone number of a calling party of a communication terminal which received an incoming call" is received as display contents related to the communication terminal 21a, and the setting of "an upper right of a screen" is received as a size and a position of display contents. After the setting, if the communication terminal 21a receives an incoming call, the controller 17 displays the name and the telephone number of the calling party of the communication terminal 21a, at the upper right of the screen of the display monitor 41a as illustrated in FIG. 10B. This display allows the driver to know that the rear seat passenger received an incoming call in a state where use of the communication terminal of the rear seat passenger can be monitored.

Figure 10C:
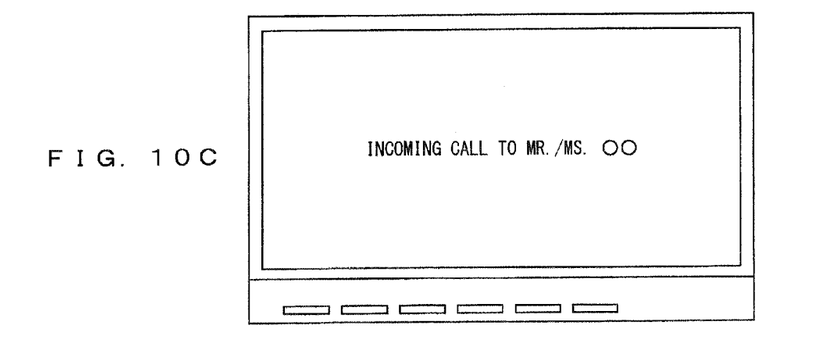

Further, for example, the setting of "a name of an owner of a communication terminal which received an incoming call" is received as display contents related to the communication terminal 21a, and a setting of "a full screen" is received as a size and a position of display contents. After the setting, if the communication terminal 21a receives an incoming call, the controller 17 displays the name of the owner of the communication terminal 21a on the full screen of the display monitor 41a as illustrated in FIG. 10C. This display allows the driver to reliably know that the rear passenger received an incoming call.

Returning to FIG. 9, after step S33 or S34, in step S35, the controller 17 receives, from the user through the touch panel 41, whether or not to use a display of an RSE monitor. When receiving that the display of the RSE monitor is used, the process proceeds to step S36, and otherwise, the process proceeds to step S37.

Herein, an operation in step S36 will be described assuming that using the RSE monitor 45a among the RSE monitors 45a and 45b is received. In step S36, similarly to step S34, the controller 17 receives, from the user through the touch panel 41, setting contents (display contents and a size and a position of the display contents) related to the display of the RSE monitor 45a.

Figure 11A:
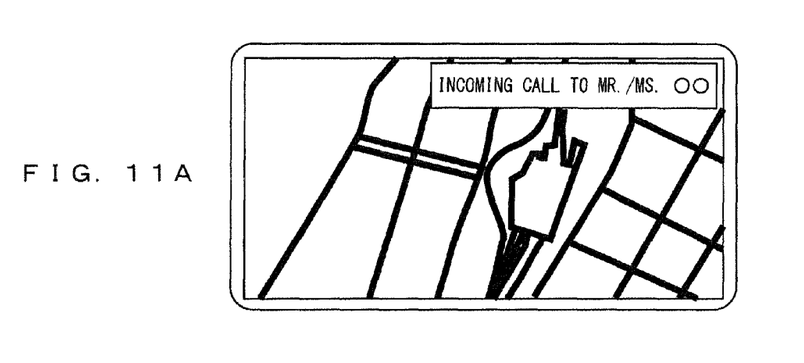
FIGS. 11A to 11C are views illustrating a display example of the in-vehicle system according to the modified example 1.

For example, the setting of "a name of an owner of a communication terminal which received an incoming call" is received as display contents related to the communication terminal 21a, and the setting of "an upper right of a screen" is received as a size and a position of display contents. After the setting, if the communication terminal 21a receives an incoming call, the controller 17 causes the RSE monitor 45a to notify incoming call information with a display matching the setting contents. That is, the controller 17 displays the name of the owner of the communication terminal 21a, at the upper right of the screen of the RSE monitor 45a as illustrated in FIG. 11A.

Figure 11B:
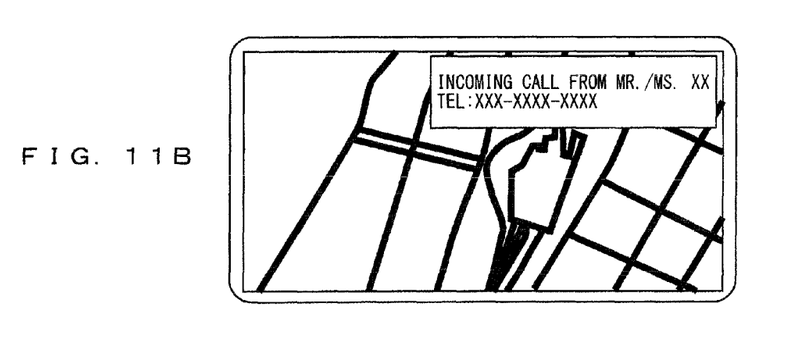
Figure 11C:
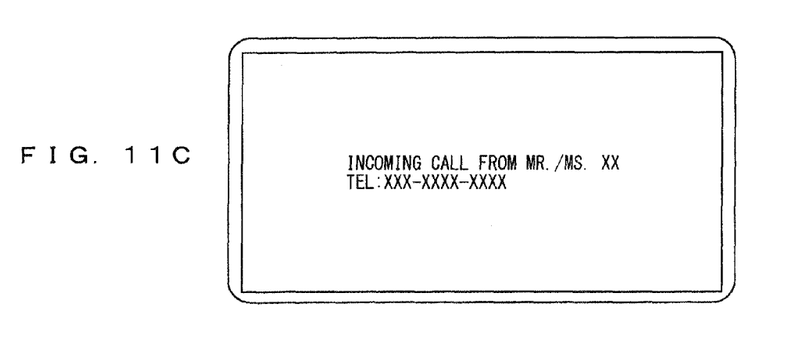

Further, for example, the setting of "a name and a telephone number of a calling party of a communication terminal which received an incoming call" is received as display contents related to the communication terminal 21a, and the setting of "an upper right of a screen" is received as a size and a position of display contents. After the setting, if the communication terminal 21a receives an incoming call, the controller 17 displays, according to the above setting contents, the name and the telephone number of the calling party of the communication terminal 21a, at the upper right of the screen of the RSE monitor 45a as illustrated in FIG. 11B. Further, for example, the setting of "a name and a telephone number of a calling party of a communication terminal which received an incoming call" is received as display contents related to the communication terminal 21a, and the setting of "a full screen" is received as a size and a position of display contents. After the setting, if the communication terminal 21a receives an incoming call, the controller 17 displays, according to the above setting contents, the name and the telephone number of the calling party of the communication terminal 21a, on the full screen of the RSE monitor 45a as illustrated in FIG. 11C.

Returning to FIG. 9, after step S35 or S36, in step S37, the controller 17 associates a series of setting contents received in steps S32, S34, and S36, and identification information (e.g., a communication terminal ID such as a SIM code or a telephone number of a communication terminal) unique to a communication terminal to be set (the communication terminal 21a in the above example), with each other. Further, the controller 17 stores the association relationship obtained by this association in a storage 16.

That is, the in-vehicle information terminal according to the modified example 1 can store setting contents of the RSE monitors 45a and 45b and the display monitor 41a for each communication terminal. Consequently, even in case where a communication terminal and an in-vehicle information terminal 1 are disconnected, when the communication terminal is connected again, it is possible to read and use a series of setting contents associated with the communication terminal in the past. Consequently, it is not necessary to perform the settings in steps S32, S34 and S36 every time connection is established, and labor required for connection can be reduced.

Further, the in-vehicle information terminal 1 according to the above modified example 1 can individually set setting contents related to displays of the RSE monitors 45a and 45b, and setting contents related to a display of the display monitor 41a. Consequently, it is possible to increase the degree of freedom for a combination of displays, and realize a display meeting a user preference.

Note that, when the above setting is made for the first time, the setting is received in steps S32, S34, and S36 as described above. However, the setting is not limited thereto. A plurality of setting patterns obtained by combining the setting contents in steps S32, S34, and S36 may be stored in the storage 16 in advance, and one setting pattern selected by a user may be received at the touch panel 41. According to this configuration, it is possible to receive the setting contents in steps S32, S34, and S36 at once and, consequently, reduce a labor of the user required for setting in each step.

Modified Example 2

In above step S3 (FIG. 3), display unit position information is information which enables specification of a position of an RSE monitor based on a seat type of a rear seat passenger who mainly uses the RSE monitor. However, the display unit position information is not limited thereto. The display unit position information may be information for specifying a position of an RSE monitor based on a coordinate position defined in advance in a vehicle 81.

Further, a plurality of position patterns obtained by combining positions of a plurality of RSE monitors may be stored in advance in a storage 16, and one position pattern selected by a user may be received by a touch panel 41 as display unit position information. According to this configuration, it is possible to specify positions of a plurality of RSE monitors at once and, consequently, reduce a labor of the user required for setting the positions.

Further, a configuration in which the user inputs the display unit position information to the touch panel 41 has been described above. However, the configuration is not limited thereto. A configuration in which terminal position information is automatically obtained by communication may be employed.

For example, in a configuration in which a plurality of cables which enables wired communication with communication terminals is connected with an in-vehicle information terminal 1 (communication terminal I/F 11), each cable is arranged at each seat and each cable is associated with each seat type in advance. Further, when, for example, a communication terminal 21a of a rear seat passenger of a rear seat A is connected to a cable near the rear seat A, a controller 17 may be configured to obtain a seat type (herein, the rear seat A) associated with the cable as terminal position information of the communication terminal 21a.

Figure 12:
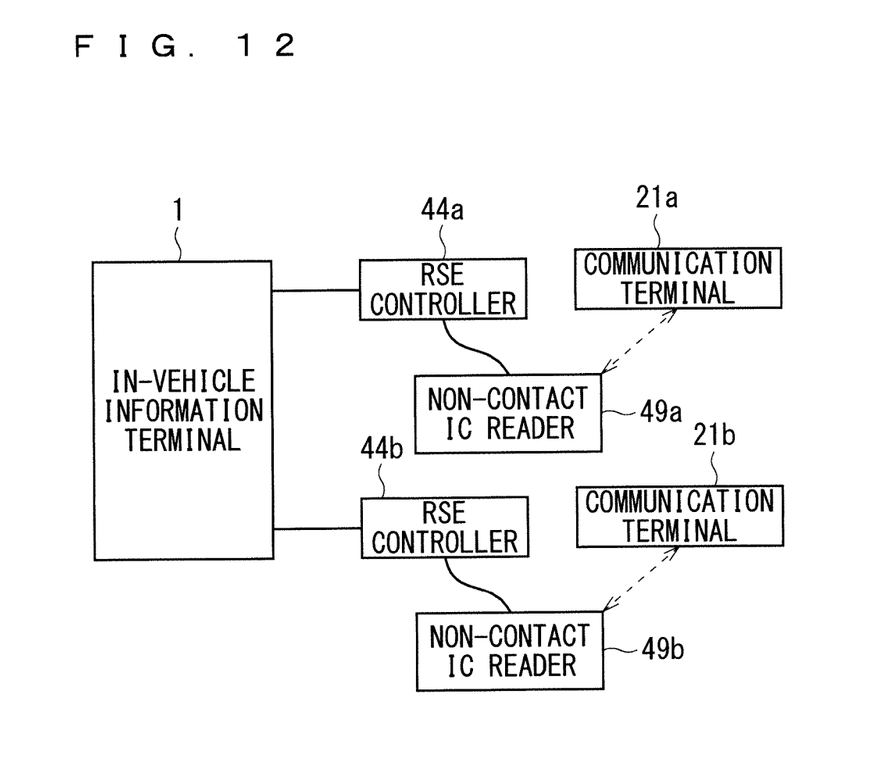
FIG. 12 is a block diagram illustrating part of a configuration of an in-vehicle system according to a modified example 2.

Alternatively, as illustrated in FIG. 12, in a configuration in which a plurality of non-contact IC readers 49a and 49b such as Felica which can perform near field communication with a communication terminal is connected with the in-vehicle information terminal 1 (in-vehicle LAN I/F 14) through RSE controllers 44a and 44b, each of the non-contact IC readers 49a and 49b is associated with each seat type in advance. Further, when, for example, the communication terminal 21a of a rear seat passenger of the rear seat A and the non-contact IC reader 49a access each other, the controller 17 may be configured to obtain a seat type (herein, the rear seat A) associated with the non-contact IC reader 49a as terminal position information of the communication terminal 21a.

Alternatively, in a configuration in which a plurality of radio receiving devices provided at a plurality of positions in the vehicle 81 is connected with the in-vehicle information terminal 1 (communication terminal I/F 11), an association relationship between positions of communication terminals and intensities of radio signals received at a plurality of radio receiving devices from the communication terminals is stored in the storage 16 in advance. Further, this configuration may be configured such that the controller 17 obtains seat position information of a communication terminal based on intensities of radio signals received by a plurality of radio receiving devices and the association relationship.

Since the above in-vehicle information terminal 1 according to the modified example 2 automatically obtains terminal position information by communication, a labor of a user to register terminal position information can be reduced.

Note that, according to the present invention, embodiments can be optionally modified and omitted in a range of the invention.

REFERENCE SIGNS LIST

1 In-vehicle Information Terminal
17 Controller
21a to 21c Communication Terminal
26 In-vehicle Device I/F
41a Display Monitor
45a, 45b RSE Monitor

The invention claimed is:
1. An in-vehicle information terminal which is capable of communicating with a communication terminal, the in-vehicle information terminal comprising:

an in-vehicle device interface which is capable of communicating with an in-vehicle device having a passenger display unit used for a passenger other than a driver, and which is capable of obtaining terminal position information indicating a position of said communication terminal in a vehicle; and a controller which associates said passenger display unit and said communication terminal with each other, based on pre-registered display unit position information indicating a position of said passenger display unit in said vehicle, and said terminal position information obtained by said in-vehicle device interface, wherein said in-vehicle device interface is capable of communicating with a second in-vehicle device having a driver display unit used for a driver, the driver display unit being separate from the passenger display unit, when said communication terminal associated with said passenger display unit receives an incoming call, said controller controls a display of said passenger display unit associated with the communication terminal through said in-vehicle device interface and also controls a display of said driver display unit through said in-vehicle device interface; and when said communication terminal associated with said passenger display unit receives an Incoming call, said controller causes said passenger display unit and said driver display unit to display incoming call information, according to setting contents related to each display.

2. The in-vehicle information terminal according to claim 1, wherein the setting contents related to said display of said passenger display unit and setting contents related to said display of said driver display unit are allowed to be individually set.

3. The in-vehicle information terminal according to claim 2, wherein the setting contents related to said display include display contents, and a size and a position of the display contents.

4. The in-vehicle information terminal according to claim 2, wherein said setting contents of said passenger display unit and said driver display unit are allowed to be stored for each said communication terminal.

5. The in-vehicle information terminal according to claim 1, wherein said controller is capable of associating said one passenger display unit with a plurality of said communication terminals.

6. The in-vehicle information terminal according to claim 1, wherein said terminal position information is automatically obtained by communication.

7. An in-vehicle information terminal which is capable of communicating with a communication terminal, the in-vehicle information terminal comprising:

an in-vehicle device interface which is capable of communicating with an in-vehicle device having a driver display unit used for a driver and communicating with a second in-vehicle device having a passenger display unit used for a passenger other than the driver, and which is capable of obtaining terminal position information indicating a position of said communication terminal in a vehicle; and a controller which associates said communication terminal with either the driver display unit or the passenger display unit based on pre-registered display unit position information indicating a position of said passenger display unit and said driver display unit in said vehicle, and said terminal position information obtained by said in-vehicle device interface, wherein when a communication terminal associated with a passenger display unit receives an incoming call, said controller displays incoming call information on said passenger display unit associated with the communication terminal through said in-vehicle device interface and also displays incoming call information on said driver display unit through said in-vehicle device interface, according to setting contents related to each display unit, and the passenger display unit being separate from the driver display unit.

* * * * *